April 15, 1952 — A. J. WARD — 2,592,627
PRESSURE VESSEL CLOSURE
Filed Feb. 11, 1946 — 3 Sheets-Sheet 1

INVENTOR.
ARTHUR J. WARD
BY M. O. Hayes
Attorney

April 15, 1952  A. J. WARD  2,592,627
PRESSURE VESSEL CLOSURE
Filed Feb. 11, 1946  3 Sheets-Sheet 2
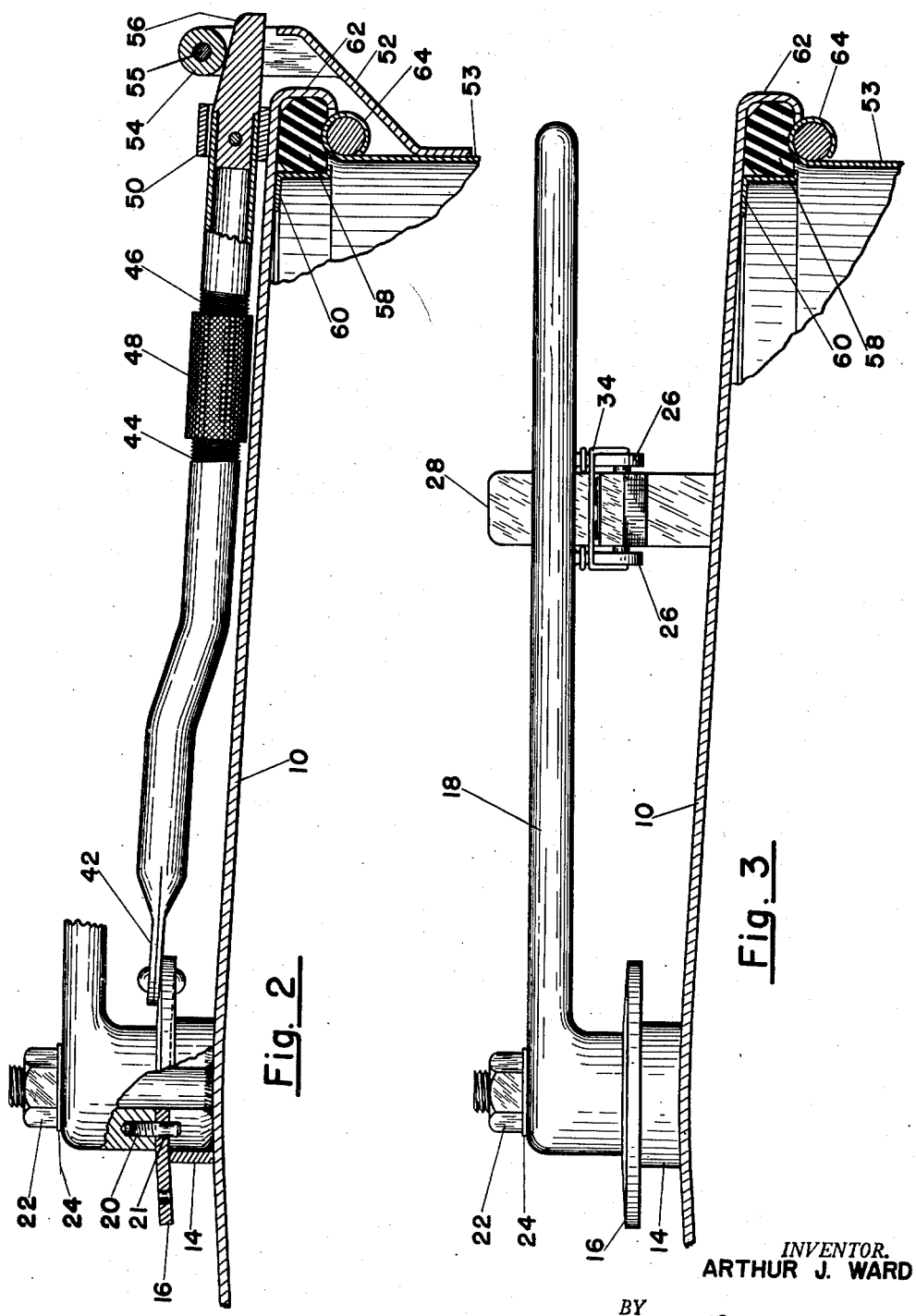
INVENTOR.
ARTHUR J. WARD
BY
M. C. Hayes
Attorney April 15, 1952  A. J. WARD  2,592,627
PRESSURE VESSEL CLOSURE
Filed Feb. 11, 1946  3 Sheets-Sheet 3

INVENTOR.
ARTHUR J. WARD
BY
*M. O. Hayes*
Attorney

Patented Apr. 15, 1952

2,592,627

UNITED STATES PATENT OFFICE 2,592,627

PRESSURE VESSEL CLOSURE

Arthur J. Ward, Washington, D. C.

Application February 11, 1946, Serial No. 646,944

1 Claim. (Cl. 220—57)

(Granted under the act of March 3, 1883, as amended April 30, 1928; 370 O. G. 757)

This invention relates to pressure vessels and in particular to a closure for a pressure cooker of relatively large capacity which (closure) is provided with a locking mechanism of sufficient strength to hold the closure in a gas tight sealing relationship to the body of the cooker.

It is known in the art to provide pressure cookers and analogous equipment with closure devices which are held in sealing position by means of radial arms mounted on the closure and which are operated by means of a rotatable wrist plate which moves the radial arms into and out of engagement with ears or lugs which are attached to the body of the container. Use of such sealing means is attended by considerable wear of the engaging surfaces which in the course of time causes the closure to leak and to be unable to maintain the gas tight seal required. To overcome this defect applicant's invention is provided with adjustable means for maintaining the gas tight seal at all times. Furthermore, applicant's apparatus is provided with automatic locking means which holds the closure in fixed gas tight sealing position.

With the above defects in view, it is therefore an object of this invention to provide a gas tight sealing closure for pressure cookers and similar equipment, and It is also an object of this invention to provide a gas tight sealing closure for pressure cookers and similar equipment in which the closure is hinged to the body of the container, and It is a further object of this invention to provide a gas tight sealing closure for pressure cookers or similar equipment in which the closure is held in gas tight sealing position by means of wedge-ended radial arms which are adapted to be adjustable longitudinally and to be movable radially by means of a rotatable wrist plate, and It is an additional object of this invention to provide the closure sealing mechanism with automatic locking means which is adapted to hold the closure in sealing relationship with respect to the body of the container.

These and other objects will be apparent from the following description, claims and from the drawings, all of which define a preferred embodiment of the invention and are not limitative with respect thereto.

In the drawings:

Figure 1 is an elevational plan view of the closure in locked sealing position, showing the relationship of the radial arms to each other, the rotatable wrist plate, the operating handle, the locking device, and the brackets on the container body which the radial arms engage.

Figure 2 is a section taken along line 2—2 of Figure 1. It is partly in elevation and partly in section. This section shows the configuration of the radial arms, the length adjusting means, the wedge shaped end of the radial arm, the relationship of the arm to the wrist plate and to the bracket on the container body and the gas tight sealing gasket.

Figure 3 is a longitudinal elevation of the operating handle and locking device taken along line 3—3 of Figure 1

Figure 1:
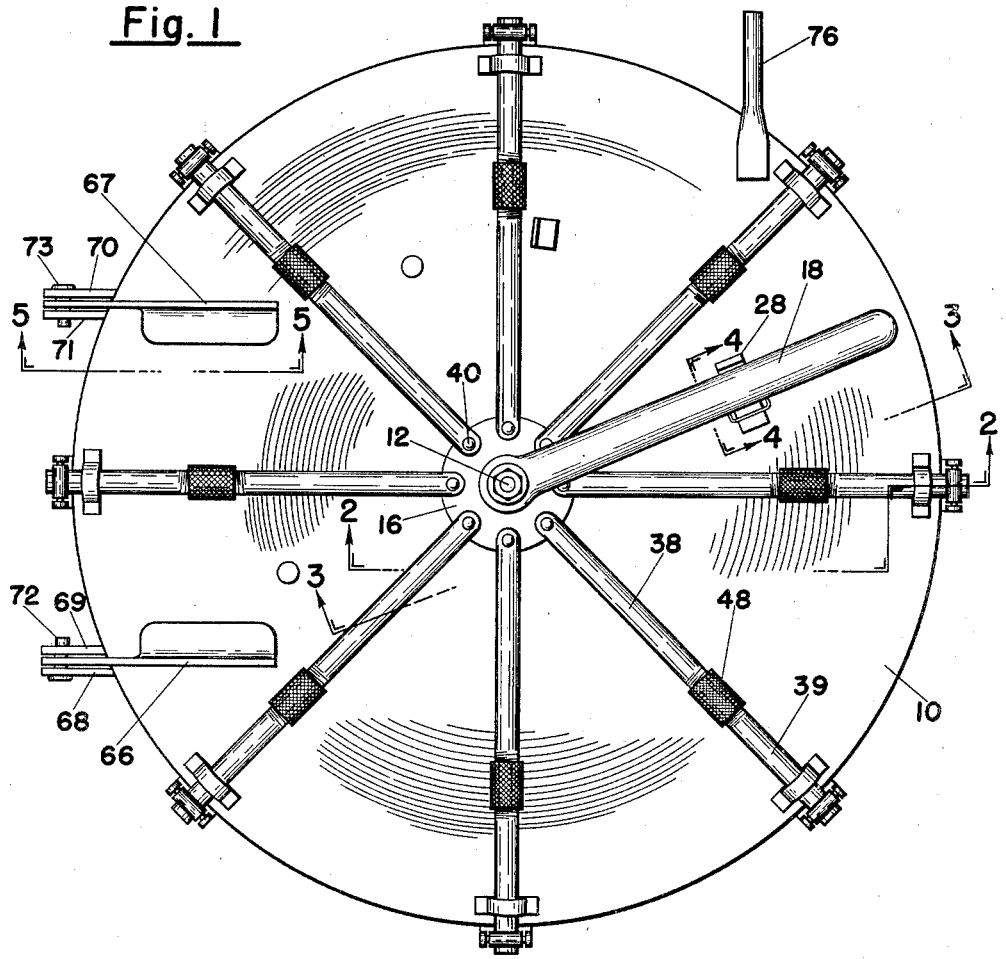
Figure 5:
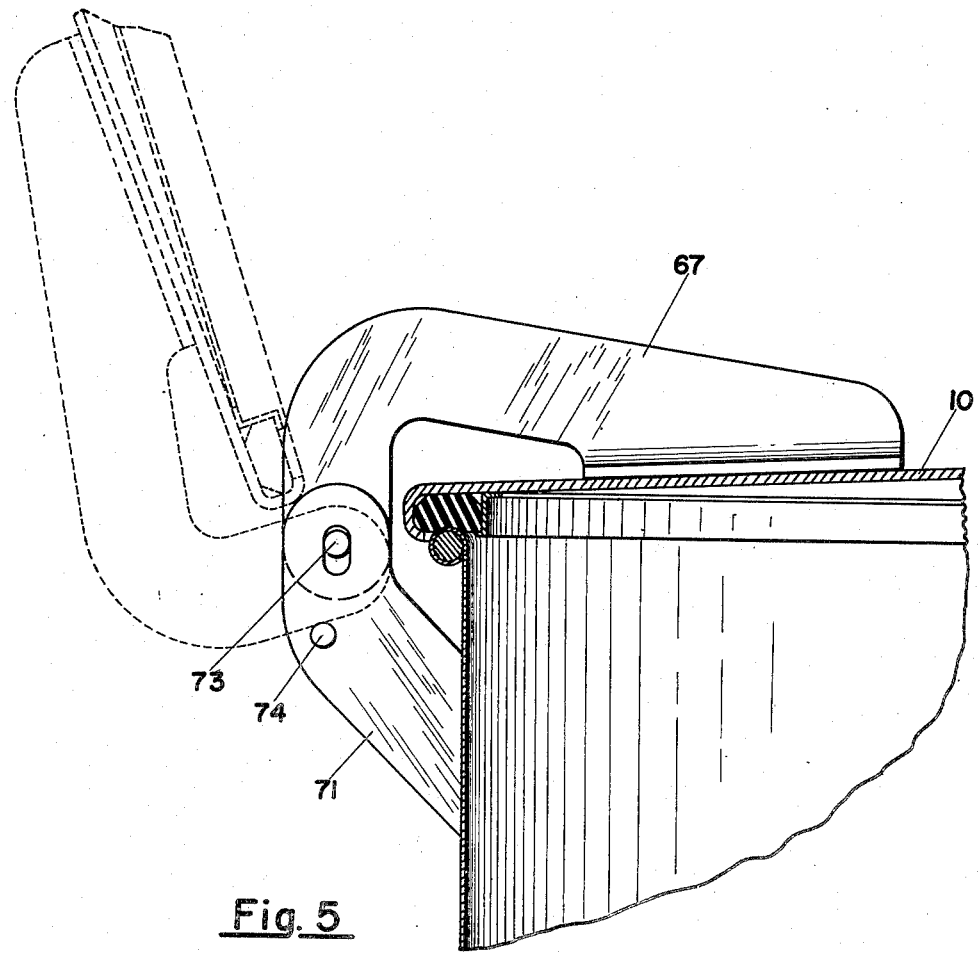
Figure 5 is a section taken along line 5—5 of Figure 1. It is partly in elevation and partly in section.
Figure 4:
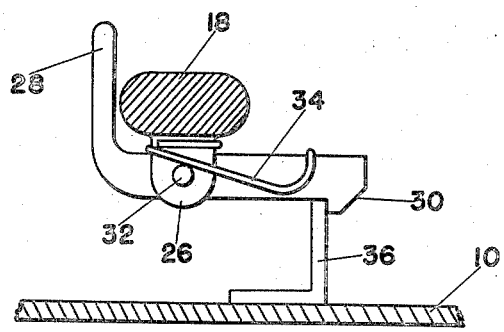
Figure 4 is a vertical transverse section taken along line 4—4 of Figure 1. It is partly in section and partly in elevation.

In the drawings 10 represents the cover plate of a pressure vessel. It is provided with a spindle 12 which is located centrally with respect to the cover plate. On spindle 12 positioned immediately above the cover plate is spacing collar 14 on which rests circular wrist plate 16 which is rotatable with respect to spindle 12. The wrist plate is rotated by means of operating handle 18 which is adapted to engage the wrist plate by means of spaced studs 20 which fit into holes 21 in the wrist plate. The assembly of spacing collar, wrist plate and operating handle is held in position on spindle 12 by means of nut 22 which engages the threaded end of the spindle and by washer 24. Nut 22 is adapted to be locked in position by any conventional means such as a cotter key. Operating handle 18 is provided with lugs 26 which are adapted to pivotally support latch 28 which is in the form of a bellcrank. This latch is provided with a champfered detent 30 which is adapted to engage locking angle or stop 36. Latch 28 is biased to locking position by spring 34.

Wrist plate 16 pivotally supports a plurality of radial angularly spaced arms as at 40. In this embodiment these arms are of tubular structure and are in two sections, 38 and 39. These sections are threaded as at 44 and 46, the one right-handed and the other left-handed and are adapted to coact with coupling sleeve 48 to form a means which is adapted to vary the overall length of the arm. Radial arm section 39 extends through bracket guide 50 which limits the lateral displacement of the radial arm as it moves into and out of engagement with roller bracket 52 which is rigidly attached to container body 53. Bracket 52 is provided with a roller 54 which is rotatably mounted in the legs of this bracket by means of axial pin 55. Radial arm section 39 is bevelled, cammed or wedge shaped in vertical section at its outer end. This wedged end is adapted to engage roller 54 as the radial arm is moved outwardly by wrist plate 16. Obviously such movement will force cover plate 10 into close contact with the rolled rim of container body 53. In order to make this contact gas tight cover plate 10 is provided with an annular, rubber gasket 58 which is held in place by the formed edge 62 of the cover plate and an annular "Z" bar structural shape 60.

Cover plate 10 is provided with male hinge arms 66 and 67 which are respectively pivoted between pairs of female hinge arms 68, 69 and 70, 71 by means of pivot pins 72 and 73. The bearings of these pivot pins 72 and 73 in hinge arms 68, 69, 70 and 71 are slotted vertically to permit vertical movement of the cover plate 10 in its sealing action. Hinge arms 66 and 67 are rigidly attached to cover plate 10 and the hinge arms 68, 69, 70 and 71 are rigidly attached to container body 53. The pivoting axis of the hinge is off-set with respect to container body 53 in order that when the cover plate is swung on its hinge, it is lifted in the clear of the container body. Stop pins 74 are so positioned on hinge arms 68, 69, 70 and 71 to limit the swing of the cover plate to approximately 110° in which position the chance of an unexpected closing of the cover is very remote. Cover plate 10 is also provided with a lifting handle 76 which is adapted to be attached to a lifting rope or chain.

In operation of the closure device of this invention, after a charge of food to be cooked has been placed in the container body, the cover lid with the radial arms retracted, i. e., with wrist plate rotated in a counter-clockwise direction, is lowered into position. The operating handle is then moved in a clockwise direction until the detent of the latch drops over the vertical leg of the locking angle. This movement causes the wedge-shaped ends of the radial arms to engage the rollers in the container body brackets. The rubber gasket of the cover plate is thereby forced into close contact with the rolled rim of the container body and a gas tight seal is formed. To compensate for wear of the gasket or other wearing parts or for any unevenness in the application of pressure by the radial arms, the length of the latter may be varied by means of turning the coupling sleeve in the direction to increase or decrease the length thereof as required.

While in above description and drawings a particular embodiment of this invention has been shown, it is not desired to be strictly limited thereto as other types and modifications of the structural elements may be used such as, for example, a different form of locking mechanism or other means of varying the length of the radial arms without departing from the spirit and scope of the invention as defined by the herewith appended claim.

The invention described herein may be manufactured and used by or for the Government of the United States of America for governmental purposes without the payment of any royalties thereon or therefor.

I claim:

In a closure device for a cylindrical pressure vessel having a plate cover, a rim sealing mechanism for said vessel, said mechanism comprising a disc-like wrist-plate, means pivotally mounting said wrist-plate on the top central surface of said plate cover, a plurality of radially movable arms, means pivotally connecting said arms at one end to the rim of said wrist-plate for radial movement of a predetermined distance and having on the other end an upwardly facing inclined cam surface extending along said arm a distance equal to said predetermined distance, a handle, means rigidly attaching said handle to said wrist-plate so that movement of said handle projects and retracts said arms radially of said cover, a convexly curved rim on said vessel, a flexible annular gasket mounted on the underside of said cover for engaging said curved rim, a plurality of guide brackets, means respectively affixing each of said brackets on said cover for receiving each of said arms, a plurality of roller brackets, said roller brackets comprising a plate having a pair of spaced upstanding lugs for mounting a roller therebetween, means securing each of said roller brackets to said vessel, means aligning each of said roller brackets with each of said arms whereby the cam surface of said arms engages said rollers and moves through said predetermined distance to secure said cover to said vessel, and means for locking said handle and arms in the radially projected position, said locking means comprising a pair of spaced depending lugs formed integral with said handle, a spring operated latch having a detent in one end thereof, means mounting said latch between said lugs, an angle arm operating as a keeper for said latch secured to said cover whereby said handle is locked in a fixed closed position when the detent of said latch engages the upstanding portion of said angle arm thus precluding the possibility of forcible dislodgment of said cover because of excessive pressure in said vessel.

ARTHUR J. WARD.

REFERENCES CITED

The following references are of record in the file of this patent:

UNITED STATES PATENTS

| Number | Name | Date |
| --- | --- | --- |
| 622,546 | Shaw | Apr. 4, 1899 |
| 838,093 | Emmons | Dec. 11, 1906 |
| 1,092,289 | Reese | Apr. 7, 1914 |
| 1,326,081 | Parish | Dec. 23, 1919 |
| 2,011,675 | Cawood | Aug. 20, 1935 |
| 2,033,305 | Roy | Mar. 10, 1936 |
| 2,237,528 | Marasso | Apr. 8, 1941 |
| 2,309,617 | Benson | Jan. 26, 1943 |
| 2,395,602 | Wittenberg | Feb. 26, 1946 |
| 2,447,042 | Velie | Aug. 17, 1948 |
| 2,453,492 | Carter | Nov. 9, 1948 |

FOREIGN PATENTS

| Number | Country | Date |
| --- | --- | --- |
| 31,489 | France | Dec. 2, 1926 |
| 622,757 | France | Mar. 7, 1927 |